(12) United States Patent  
Kachouh et al.

(10) Patent No.: US 7,970,517 B2  
(45) Date of Patent: Jun. 28, 2011

(54) PASSIVE CONTROL OF VEHICLE INTERIOR FEATURES BASED UPON OCCUPANT CLASSIFICATION

(75) Inventors: Patricia Kachouh, Sterling Heights, MI (US); Susan Drescher, Birmingham, MI (US); Tejas Desai, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1226 days.

(21) Appl. No.: 11/355,267

(22) Filed: Feb. 15, 2006

(65) Prior Publication Data

US 2006/0241836 A1    Oct. 26, 2006

Related U.S. Application Data

(60) Provisional application No. 60/673,239, filed on Apr. 6, 2005, provisional application No. 60/673,240, filed on Apr. 6, 2005, provisional application No. 60/673,241, filed on Apr. 6, 2005, provisional application No. 60/673,242, filed on Apr. 6, 2005, provisional application No. 60/673,243, filed on Apr. 6, 2005.

(51) Int. Cl.
*G05D 1/00* (2006.01)

(52) U.S. Cl. .......................................................... 701/49

(58) Field of Classification Search ................... 701/45, 701/49, 36; 180/272–273, 280
See application file for complete search history.

(56) References Cited

U.S. PATENT DOCUMENTS

| | | | | |
|---|---|---|---|---|
| 5,624,132 A | * | 4/1997 | Blackburn et al. | 280/735 |
| 5,712,625 A | * | 1/1998 | Murphy | 340/5.22 |
| 6,961,658 B2 | * | 11/2005 | Ohler | 701/209 |
| 2005/0140127 A1 | * | 6/2005 | Nakajima | 280/731 |
| 2006/0145537 A1 | * | 7/2006 | Escott | 307/10.1 |
| 2006/0208169 A1 | * | 9/2006 | Breed et al. | 250/221 |

* cited by examiner

*Primary Examiner* — Kim T Nguyen

(57) ABSTRACT

The present invention includes a method of monitoring and controlling interior functions of a vehicle, for example, a memory seat position, a vehicle pedal position, a steering column position, a vehicle interior temperature, and/or whether the vehicle is occupied or unoccupied at certain times and under certain conditions. The interior functions are controlled by passively monitoring a characteristic of an occupant, determining an identity of the occupant based on the monitored characteristic, and regulating the interior function based upon the identity of the occupant. The monitored characteristic, for example, may be representative of a weight classification or biomass associated with the occupant, or a signal or input generated based upon a user identification device, for example, a key fob or other personal electronic device carried by the occupant.

15 Claims, 3 Drawing Sheets

*Fig-4B*  Forward in Vehicle

PASSIVE CONTROL OF VEHICLE INTERIOR FEATURES BASED UPON OCCUPANT CLASSIFICATION

The application claims priority to U.S. Provisional Application Nos. 60/673,239, 60/673,240, 60/673,241, 60/673,242, and 60/673,243, all of which were filed on Apr. 6, 2005.

BACKGROUND OF THE INVENTION

Vehicles typically include numerous interior features that are electronically controlled by a user. For example, memory settings are employed to electronically control vehicle seat position, pedal position and steering column position; child latches are electronically controlled to prevent children from activating a vehicle door at an inappropriate time; and windows including express up/express down also incorporate electronic lock-out features that are operable to disable this function. However, all of these electronically controlled interior features require some form of continuing active input from the user.

Memory settings, for example, require each individual user to program initial settings and provide additional active input prior to each vehicle use to engage the appropriate memory settings. Once the user has initially programmed memory settings defining his/her preferred vehicle seat position, known systems require further active user input to activate the memory settings. In one known system, the user must press a button located, for example, either on a vehicle fob or on the interior of the vehicle prior to activating the memory settings associated with that user. Another known system requires the user to start the vehicle before activating the memory settings associated with that user.

In addition, because known systems require active input by the user, the memory settings, for example, are actually specific to the active input provided and not to the user himself. Therefore, it is desirable to provide passive control of vehicle interior functions based upon a user or occupant classification.

SUMMARY OF THE INVENTION

The present invention includes a method of controlling an interior function of a vehicle, for example, a memory seat position, a vehicle pedal position, and/or a steering column position. The interior function is controlled by passively monitoring a characteristic of an occupant, determining an identity of the occupant based on the monitored characteristic, and regulating the interior function based upon the identity of the occupant. The monitored characteristic, for example, may be representative of a weight classification or biomass associated with the occupant, or a signal or input generated based upon a user identification device, for example, a key fob or other personal electronic device carried by the occupant.

The present invention also includes a method of controlling an interior function of a vehicle when the vehicle is parked and locked. The interior function, for example, a vehicle interior temperature, is monitored and subsequently regulated when the system determines that the parked/locked vehicle remains occupied for a period of time subsequent to being parked and locked. The method of the present invention also provides notification to alert a driver and/or an authority when the parked/locked vehicle remains occupied.

Finally, the present invention includes a method of monitoring an interior of a vehicle to determine whether the vehicle becomes occupied subsequent to being parked and locked and notifying a driver if the previously unoccupied vehicle becomes occupied while parked.

These and other features of the present invention can be best understood from the following specification and drawings, the following of which is a brief description.

BRIEF DESCRIPTION OF THE DRAWINGS

FIG. 4B is a schematic illustration of the vehicle that incorporates the interior function selectively restricted according to the embodiment of the method of the present invention shown in FIG. 4A.

DETAILED DESCRIPTION OF THE PREFERRED EMBODIMENT

Figure 1:
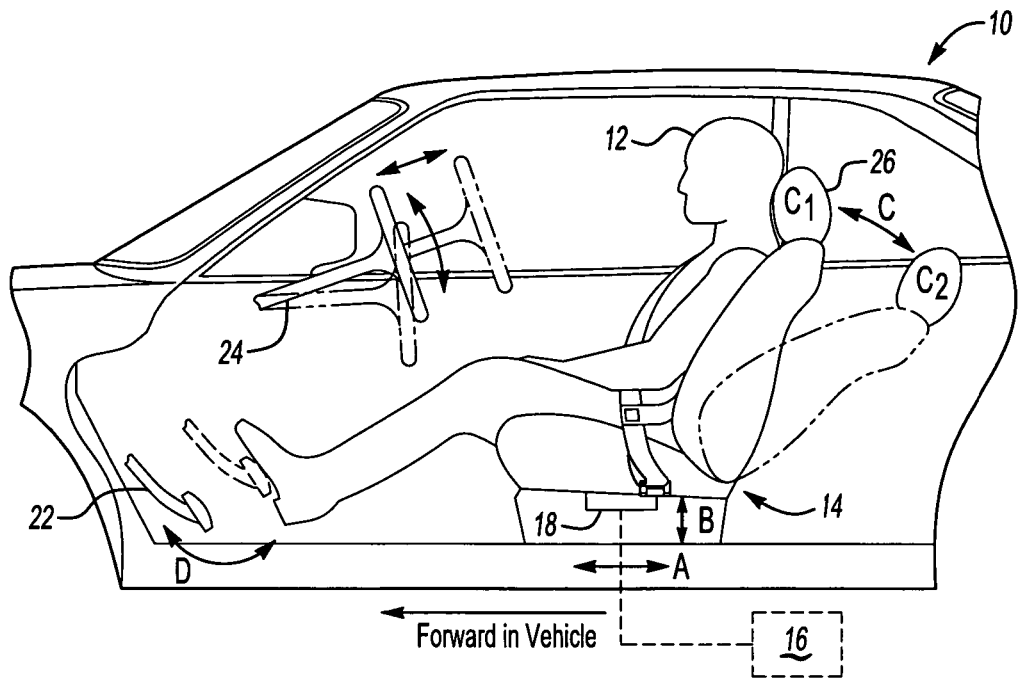
FIG. 1 is a schematic illustration of a vehicle that incorporates example vehicle interior functions which are controlled by one embodiment of the method of the present invention based upon a monitored occupant characteristic.

FIG. 1 is a schematic illustration of a vehicle 10 that incorporates example vehicle interior functions, which include memory settings electronically controlled by one embodiment of the method of the present invention. The memory settings are controlled based upon a monitored occupant characteristic, for example, a weight classification or a biomass.

Initially, when a first driver 12 is seated in a vehicle seat 14, the first driver 12 manually adjusts a variety of vehicle interior functions to his/her desired positions. The desired positions are subsequently stored as a first set of memory settings in a feature control system 16 and associated with the first driver 12 within the feature control system 16.

A weight classification and/or a biomass of the first driver 12 is measured contemporaneously with the first driver 12 setting the first set of memory settings by a sensing system 18. The weight classification is indicative of an overall weight of the first driver 12 as measured by, for example, a strain gage arrangement included in the sensing system 18, which is imbedded in the vehicle seat 14. When the first driver 12 sits on the vehicle seat 14, the overall weight of the first driver 12 induces a strain that is representative of the overall weight of the first driver 12. The measured overall weight is then transmitted to the feature control system 16 where it is stored in relationship to the first set of memory settings.

The biomass is indicative of a wet weight of the first driver 12. The wet weight is measured by traditional means, for example, a bio-sensor included in the sensing system 18. The bio-sensor measures not only the overall weight of the first driver 12 but also measures the amount of the overall weight that is water. Measuring the portion of weight of an occupant that is water allows the system to differentiate between, for example, a 100-pound occupant and a 50-pound child in a 50-pound child seat. The biomass, i.e., the wet weight, of the 100-pound occupant would be greater than the biomass, i.e. the wet weight, of the 50-pound child in the 50-pound child seat.

The sensing system 18 transmits the measured weight classification and/or the biomass of the first driver 12 to the feature control system 16. The weight classification and/or biomass of the first driver 12 are stored in the feature control system 16, where they are associated with the first set of memory settings and the first driver 12. Further, this process can be conducted for any number of drivers. That is, each individual driver can create a unique set of memory settings associated with himself/herself. A weight classification and/or biomass of each individual driver is measured and associated with the unique set of memory settings, and stored in the feature control system 16.

Subsequently, when a driver enters the vehicle 10, the sensing system 18 will measure the weight classification and/or the biomass of the driver and transmit the measured weight classification and/or biomass to the feature control system 16. The feature control system 16 then associates the measured weight classification and/or biomass with the respective driver and the set of memory settings previously stored by that driver as indicated by the measured weight classification and/or biomass. The feature control system 16 then transmits signals to the various interior features controlled by the memory settings to electronically adjust the various interior features to their pre-determined desired positions.

For example, when the first driver 12 enters the vehicle 10 and sits in the vehicle seat 14, the sensing system 18 measures the weight classification and/or biomass associated with the first driver 12, and transmits the weight classification and/or biomass associated with the first driver 12 to the feature control system 16. The feature control system 16 associates the transmitted weight classification and/or biomass of the first driver 12 with the first set of memory settings, and then transmits signals to the various interior features controlled by the memory settings to electronically adjust the various interior features to their pre-determined desired positions.

The set of memory settings transmitted to the various interior features by the feature control system 16 depends on the weight classification and/or biomass received by the feature control system 16 from the sensing system 18. As this is determined when the driver sits in the seat, this entire process is conducted passively, i.e., does not require any active input from the driver.

In the illustrated embodiment, the sensing system 18 is located in the vehicle seat 14 and the example vehicle interior functions, which include electronically controlled memory settings, may include but are not limited to positioning of the vehicle seat 14, vehicle pedals 22, and/or steering column 24.

The entire vehicle seat 14 is moveable forward and rearward in vehicle 10 as illustrated by arrow A and upward and downward in vehicle 10 as illustrated by arrow B. A back portion 26 of the vehicle seat 20 is moveable from an upright sitting position $C_1$ to a reclined position $C_2$ as illustrated by arrow C.

The vehicle pedals 22 are moveable away from and toward the first driver 12 in vehicle 10 as illustrated by arrow D.

Figure 2:
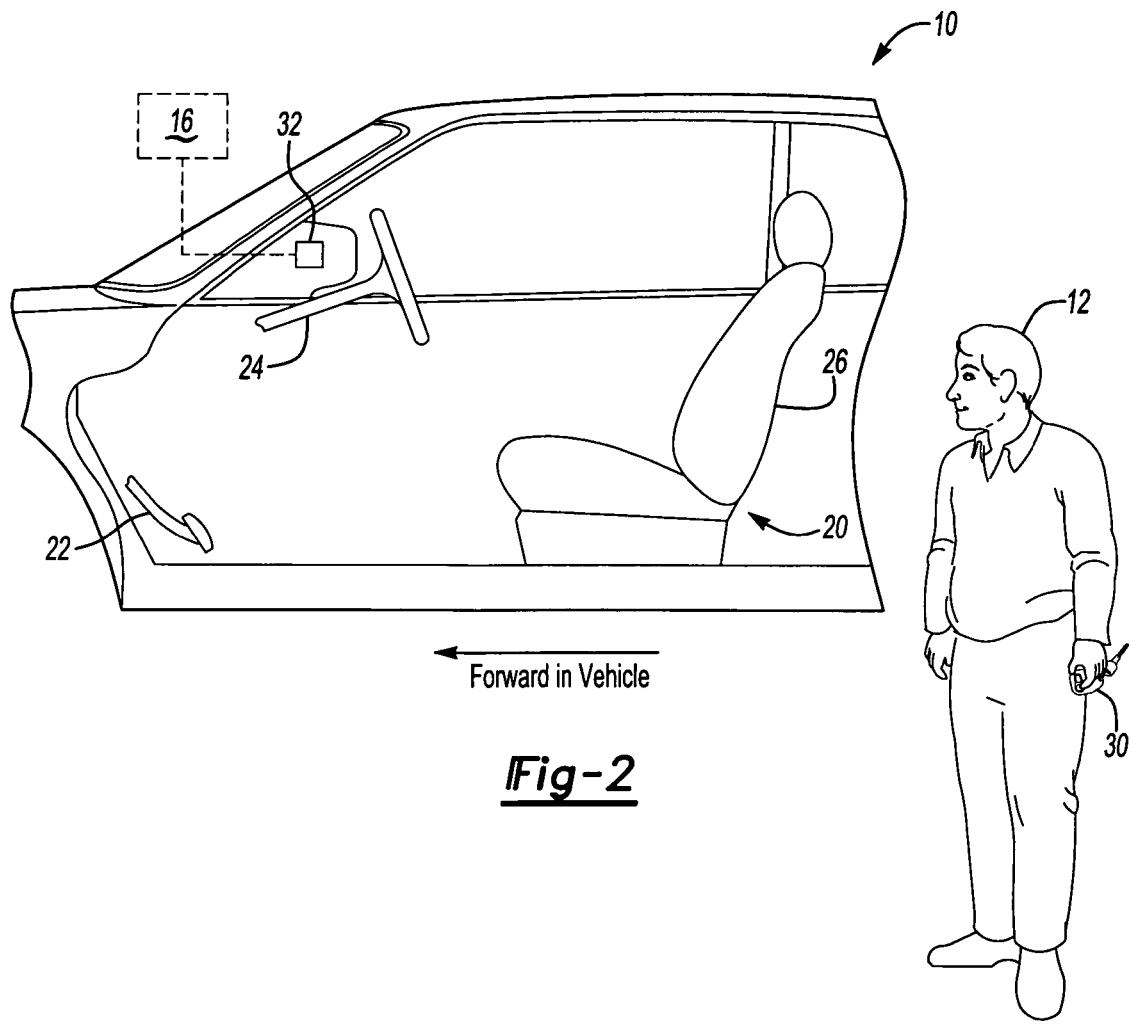
FIG. 2 is a schematic illustration of a vehicle that incorporates example vehicle interior functions including memory settings which are controlled by another embodiment of the method of the present invention based upon a user identification device.

FIG. 2 is a schematic illustration of a vehicle 10 that incorporates example vehicle interior functions, which include memory settings that are electronically controlled by another embodiment of the method of the present invention based upon a user identification device.

In the illustrated embodiment, the memory settings are initially set as discussed above in FIG. 1, but are passively controlled by a user identification device 30, for example, a key fob or a personal electronic device carried by the occupant. When the driver 12 comes within a pre-defined distance of the vehicle 10, the user identification device 30 transmits a signal to a receiver 32 associated with the vehicle 10. The receiver 32 communicates the signal to the feature control system 16, which transmits signals to the various interior features controlled by the memory settings to adjust the various interior features to their pre-determined desired positions as discussed previously in FIG. 1. As such, the vehicle interior functions associated with the memory settings are passively controlled based upon the signal received from the user identification device 30.

Figure 3:
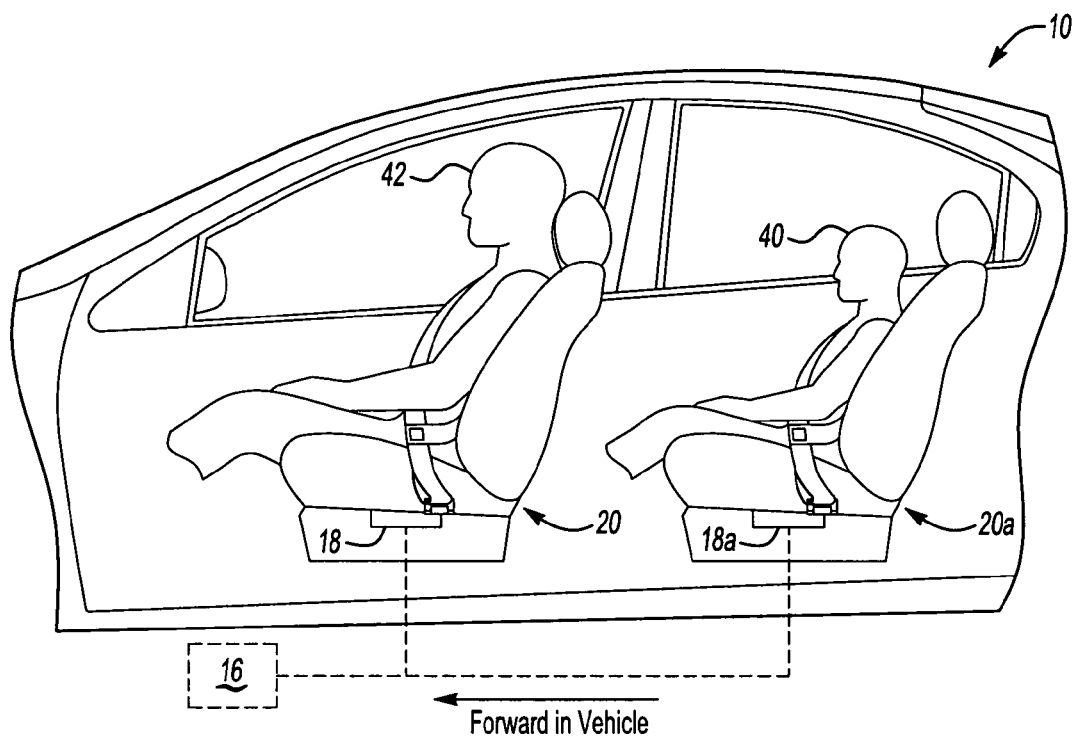
FIG. 3 is a schematic illustration of a vehicle that incorporates example vehicle interior functions which are selectively overridden according to yet another embodiment of the method of the present invention.

FIG. 3 is a schematic illustration of a vehicle 10 that incorporates example vehicle interior functions that are selectively overridden according to yet another embodiment of the method of the present invention. The example vehicle interior functions that are selectively overridden include but are not limited to an express up/down feature associated with a window and/or a child safety latch. These example vehicle interior functions are electronically controlled by a feature control system 16.

When the vehicle 10 is equipped with the express up/down feature, each window so equipped will automatically travel to a full-up condition or a full-down position with one touch of a window control instead of requiring the window control to be held down through the entire window travel. As such, if a child occupant 40 is located in a seat next to a window equipped with this feature, there is a risk that the child occupant 40 will activate the feature in an undesirable manner.

According to the present invention, based upon the passive weight classification and/or biomass sensing strategies discussed above in FIG. 1, when a sensing system 18A senses that a child occupant 40 is located in a seat 20A, the sensing system 18A transmits a signal to the feature control system 16 identifying the location of the child occupant 40. The feature control system 16 then transmits a signal that selectively overrides the express up/down feature associated with a window proximate to the child's seat 20A. As such, this process is conducted passively based upon a sensed weight classification and/or biomass.

The vehicle 10 may be equipped with a child safety latch feature. Typically, this feature is manually activated by a driver 42 of the vehicle 10 either via an electronic switch on the driver's door or via a mechanical switch located on an inside edge of the child's door. When activated, this feature prevents the child occupant 40 from opening a vehicle door proximate to the child's seat 20A from the inside of the vehicle 10 by electronically disabling an interior latch release mechanism.

In the event that the driver 42 forgets to activate this feature, when the sensing system 18A senses that a child occupant 40 is located in a seat 20A based upon the weight classification and/or biomass sensing strategies discussed above, the sensing system 18A transmits a signal to the feature control system 16 identifying the location of the child occupant 40. The feature control system 16 then transmits a signal that selectively overrides the interior latch release mechanism associated with a door proximate to the child's seat 20A to ensure that the child safety latch feature associated with that door in engaged preventing the child occupant 40 from opening the vehicle door from inside the vehicle 10. This process is conducted passively based upon a sensed weight classification and/or biomass.

Figure 4A:
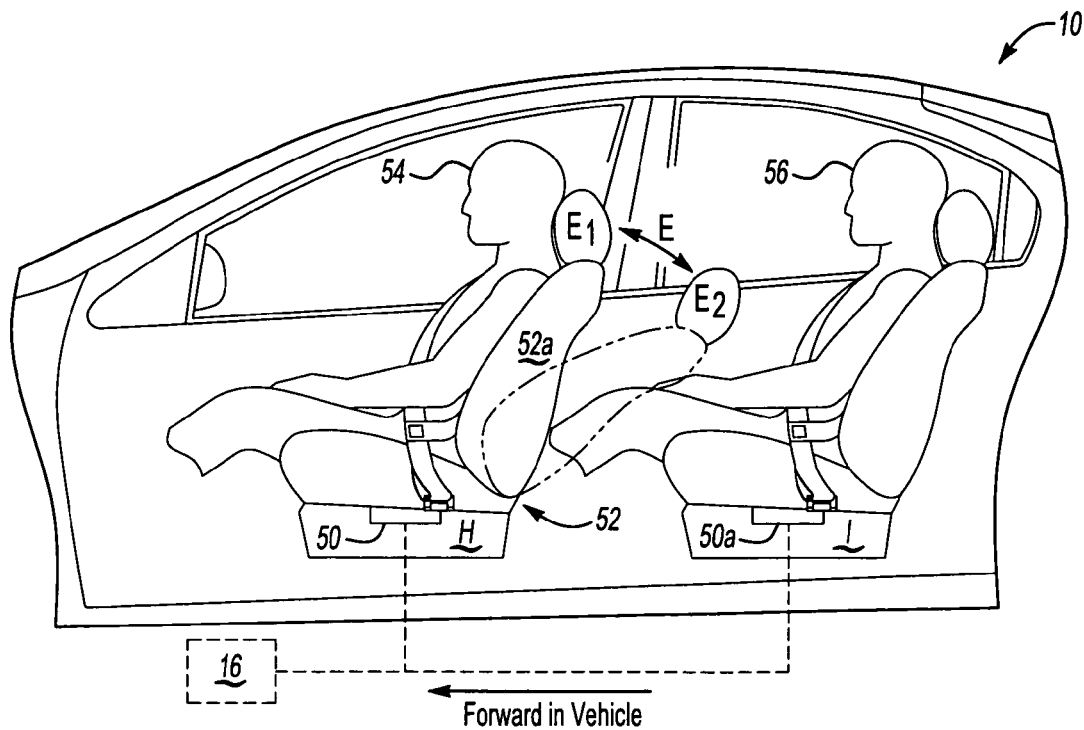
FIG. 4A is a schematic illustration of a vehicle that incorporates yet another vehicle interior function selectively restricted according to another embodiment of the method of the present invention.

FIG. 4A is a top view schematic illustration of a vehicle that incorporates yet another vehicle interior function selectively restricted according to another embodiment of the method of the present invention. In this example, the interior function that is selectively restricted includes but is not limited to an electrically controlled power-folding seat 52.

When a vehicle 10 is equipped with the electrically controlled power-folding seat 52, typically a back portion 52A of the electrically controlled power-folding seat 52 has the ability to travel from a full-up position $E_1$ to a full-down position $E_2$ as illustrated by arrow E. However, if a first occupant 54, seated in a seat H, attempts to actuate his seat to the full-down position $E_2$ and a second occupant 56 is seated in a seat I, allowing the back portion 52A to actuate to the full-down position $E_2$ may produce an undesirable result.

As such, according to the present invention, based upon the passive weight classification and/or biomass sensing strategies discussed above in FIG. 1, when a sensing system 50, 50A senses that a vehicle seat immediately behind a vehicle seat is occupied, for example, seat I which is immediately behind seat H, or seat G, which is immediately behind seat F, as shown in FIG. 4B, the sensing system 50, 50A transmits a signal to a feature control system 16 indicating that the seat I is occupied. The feature control system 16 then transmits a signal selectively restricting the travel of the back portion 52A of the seat H such that the back portion 52A will not be allowed to travel to the full-down position $E_2$. This process is conducted passively based upon the sensed weight classification and/or biomass.

Figure 5:
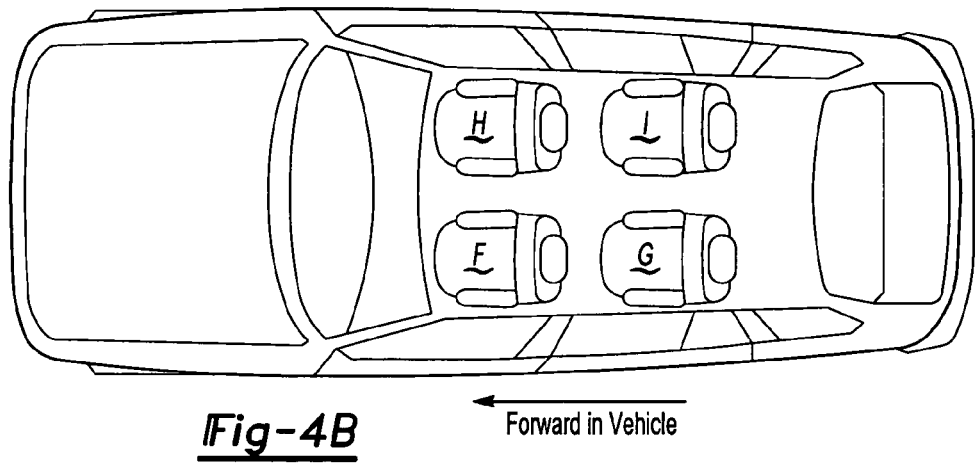
FIG. 5 is a flow chart that schematically illustrates yet another embodiment of the method of the present invention.
Figure 5:
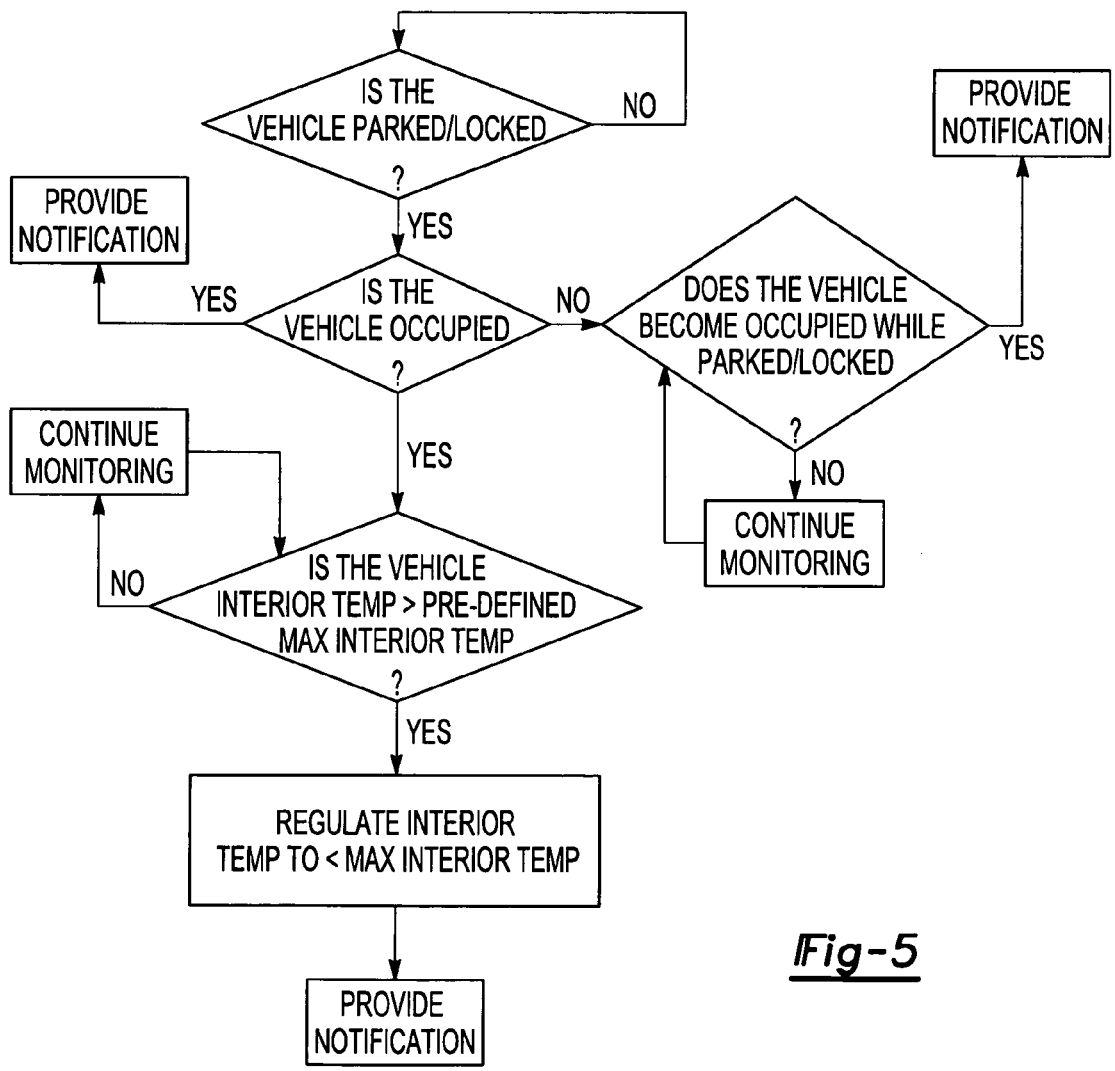

FIG. 5 is a flow chart that schematically illustrates yet another embodiment of the method of the present invention. Known vehicles have the ability to electronically sense when a vehicle is parked and locked. By incorporating the passive weight classification and/or biomass sensing strategies above in FIG. 1, the vehicle can also determine if the vehicle is occupied when the vehicle is parked and locked and/or if the vehicle becomes occupied subsequent to the vehicle being parked and locked.

If the vehicle is occupied when the vehicle is initially parked and locked, and this occupation continues, the vehicle will monitor an interior function and regulate that interior function after the vehicle is parked and locked. For example, if a child and/or a pet are left in the vehicle, and the vehicle is parked and locked, the vehicle will monitor an interior temperature of the vehicle and regulate the interior temperature of the vehicle to a pre-set level to prevent overheating of the child and/or pet. In addition, when the vehicle remains occupied after being initially parked and locked, the vehicle will provide notification that the vehicle is still occupied. This notification can be provided to the driver, for example, via an electronic signal sent by a feature control system within the vehicle to a personal electronic device carried by the driver, such as a key fob, a pager or a cell phone, or the notification can be provided to a dispatch center. The notification can also be via an audible alarm installed in the vehicle itself.

In one example, referring back to FIG. 1, the feature control system 16 controls all electronic features associated with a vehicle 10. As such, the feature control system 16 can determine when the vehicle 10 is parked and locked. Once the feature control system 16 determines that the vehicle 10 is parked and locked, weight classification and/or biomass measurements are taken via a sensing system 18. Based on these measurements, the sensing system determines whether or not the vehicle 10 is occupied. When the sensing system 18 determines that a vehicle seat 14 is occupied based upon weight classification and/or biomass, as discussed above in FIG. 1, and the vehicle 10 is parked and locked, the feature control system 16 generates a signal to provide electronic notification to the driver or initiates the audible alarm. While the illustration shows only one vehicle seat 14 and one sensing system 18 imbedded in the vehicle seat 14, it is to be appreciated that the vehicle 10 may include multiple vehicle seats 14, which further include multiple sensing systems 18, all of which transmit information to the feature control system 16.

Conversely, if the sensing system 18 determines that the vehicle 10 is unoccupied when the vehicle 10 is parked and locked, but becomes occupied while remaining parked and/or locked, the feature control system 16 will also generate a signal to provide electronic notification to the driver that the vehicle has become occupied. For example, if the vehicle 10 is parked and locked in a store parking lot while the driver goes into shop and someone breaks into the vehicle 10 while the driver is in the store, the driver will be notified of the occupation. This can minimize theft and damage to the vehicle and its contents. Again, this notification can be provided to the driver via a personal electronic device, for example, a key fob, pager or cell phone. This notification can also be provided to a dispatch center, or via an audible alarm as discussed above.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling an interior function of a vehicle comprising the steps of:

measuring a biomass associated with at least one occupant with a sensor disposed within an interior of a vehicle;

correlating an identity of the at least one occupant with the biomass that is unique to the at least one occupant with a microcontroller mounted within the vehicle;

selecting a desired position of at least one interior function of the vehicle by at least one occupant from a plurality of positions stored within the microcontroller;

associating the identity of the at least one occupant with the selected position of the at least one interior function of the vehicle from the positions stored within the microcontroller;

determining an identity associated with the at least one occupant based upon the at least one measured characteristic; and adjusting the at least one interior function with a command from the microcontroller to the selected position responsive to the measured characteristic correlating to the identity of the at least one occupant.

2. The method of control as recited in claim 1, further comprising the steps of:

correlating the identity of the at least one occupant to a corresponding memory setting; and adjusting a current condition of the at least one interior function to the corresponding memory setting.

3. The method of control as recited in claim 2, wherein the memory setting is associated with a vehicle seat position.

4. The method of control as recited in claim 2, wherein the memory setting is associated with a vehicle pedal position.

5. The method of control as recited in claim 2, wherein the memory setting is associated with a steering column position.

6. The method of control as recited in claim 1, wherein the identity of the at least one occupant is determined based upon a measured weight of the at least one occupant.

7. The method of control as recited in claim 1, wherein the identity associated with the at least one occupant is determined based upon a user identification device.

8. The method of control as recited in claim 7, wherein the user identification device is a key fob.

9. The method of control as recited in claim 7, wherein the user identification device is a user entry code.

10. The method of control as recited in claim 7, wherein the user identification device is a personal electronic device.

11. The method of control as recited in claim 1, further including the step of:

selectively overriding the at least one interior function based upon the identity associated with the at least one occupant.

12. The method of control as recited in claim 11, wherein the at least one interior function is at least one vehicle latch.

13. The method of control as recited in claim 11, wherein the at least one interior function is at least one window regulator.

14. The method of control as recited in claim 1, further including the steps of:

determining a location associated with the at least one occupant; and restricting operation of the at least one interior function based upon the identity and the location associated with the at least one occupant.

15. The method of control as recited in claim 14, wherein the at least one interior function is a power-folding seat.

* * * * *